United States Patent [19]
Aaker et al.

[11] Patent Number: 6,011,915
[45] Date of Patent: Jan. 4, 2000

[54] METHOD AND SYSTEM FOR REPLACING PHYSICAL TERMINALS INTERACTING WITH HARDWARE SPECIFIC PROGRAMS

[75] Inventors: Kenneth Dale Aaker; Mark Arnold Boegel; Harvey Gene Kiel, all of Rochester, Minn.; Thomas Edwin Murphy, Jr., Binghamton; Paul Francis Rieth, Apalachin, both of N.Y.; Anthony Paul Vinski, Rochester, Minn.

[73] Assignee: International Business Machines Corporation, Armonk, N.Y.

[21] Appl. No.: 08/946,239

[22] Filed: Oct. 7, 1997

[51] Int. Cl.[7] .................................................. G06F 9/445
[52] U.S. Cl. .................... 395/500.44; 709/203; 709/227; 709/229
[58] Field of Search ............................... 395/500, 200.57, 395/200.61, 200.59, 200.48, 200.33, 500.44; 709/227, 231, 229, 218, 203

[56] References Cited

U.S. PATENT DOCUMENTS

| | | | |
|---|---|---|---|
| 4,885,789 | 12/1989 | Burger et al. | 395/200.59 |
| 5,021,949 | 6/1991 | Morten et al. | 395/200.61 |
| 5,754,752 | 5/1998 | Sheh et al. | 395/200.57 |
| 5,754,830 | 5/1998 | Butts et al. | 395/500 |

*Primary Examiner*—Ahmad F. Matar
*Assistant Examiner*—Philip B. Tran
*Attorney, Agent, or Firm*—Jack V. Musgrove; Andrew J. Dillon

[57] ABSTRACT

Provided are a method and system for replacing terminals, linked in a client server relationship with a central server, interacting with hardware specific programs within the central server, and wherein each terminal is identified by hardware specific programs within said central server via specific hardware attributes, and where the specific hardware attributes include at least a port identification and an I/O processor identification associated with the port identification. The method and system achieve the foregoing via the following. A processor is substituted for a selected terminal. Particular hardware attributes of the selected terminal are identified. The identified particular hardware attributes of the selected terminal are emulated using communications software. And, the processor is coupled to the central server via the communications software such that the processor interacts with hardware specific programs within the central server such that the substituted processor interacts with the hardware specific programs in a fashion indistinguishable from the selected terminal.

14 Claims, 9 Drawing Sheets

METHOD AND SYSTEM FOR REPLACING PHYSICAL TERMINALS INTERACTING WITH HARDWARE SPECIFIC PROGRAMS

BACKGROUND

1. Technical Field

The present invention relates, in general, to a method and system which yield improvements to virtual terminal applications. In particular, the present invention relates to a method and system which yield improvements to virtual terminal applications and which empower the virtual terminal applications to actually serve as identically functioning replacements for physical terminals within existing computer systems.

2. Description of Related Art

With the current all-pervasive nature of widespread use of internetworking to interact with the World Wide Web, and to accomplish networked/distributed computing, it is easy to forget just how relatively new such widespread use is. Since the need for the present invention, at least in part, relates to and arises from the historical newness of such widespread use, it is helpful to set such use in a historical context, which can then serve as a springboard for introducing certain aspects of the needs for and utilities of the present invention.

Virtually no one foresaw the current pervasive nature of the widespread use of internetworking (for reasons that will be discussed below). Indeed, prior to the early 1990s, the belief among information officers at leading business concerns was that the future of computing lay in the use of mid-range to upper end computing systems (i.e. mid-range to mainframe computing systems). Consequently, throughout the sustained economic expansion of the middle and late 1980s, many business concerns invested heavily in mid-range and mainframe computing systems to serve their business interests.

In addition to investing in the hardware to serve their interests, many, if not most, business concerns also made concomitant investments in software to run on such mid-range and mainframe computing systems. Such software was often custom designed for the interests of each individual business concern and hence very expensive. Taken together such hardware and software tended to represent a significant investment for business concerns.

By the end of the 1980s, much of the expansion in computing resources among business concerns was nearing its end. It was not uncommon at the time for trade magazines to trumpet the glut of Ph.D. computer scientists and the inability of such highly trained individuals to obtain employment. It was widely acknowledged that the demise of the computing industry was imminent. However, as is well known, such demise never came to be. Rather, the computer industry was revitalized and thrown into a full-blown expansion due to the explosion of internetworking.

The explosion of internetworking can best be illustrated in reference to the explosion of use of the public Internet. The explosion of use of the public Internet can be traced to invention of the World Wide Web application software, and the subsequent attendant rise of very powerful programs, known as web browsers, which freed even non-technical people to use the power of, and communicate over, the Internet.

In 1989 the World Wide Web (WWW) was developed by English computer scientist Timothy Berners-Lee. Although the name World Wide Web would seem to indicate that the WWW is a network, it is not. The WWW is actually an application program which runs on individual computers and that creates connections to multiple different source computers over one or more networks. All WWW computer files are formatted using Hypertext Markup Language (HTML), and WWW communication among computers occurs using the Hypertext Transfer Protocol (HTTP). A computer file formatted in HTML is called a "web page" in WWW parlance.

For reasons that are not exactly clear, the invention of the World Wide Web gave rise to the invention of application programs generally known as WWW browsers (e.g., Netscape Navigator). A WWW browser program allows a file formatted in HTML/HTTP format (i.e. "web pages") to be displayed on a computer screen as an agglomeration of text, images, sound, or other visual objects, which can appear as highlighted texts or graphics, and which are in actuality subprograms to establish communications links with other machines internetworked and running WWW software. Furthermore, modern browsers have additional embedded applications (such as File Transfer Protocol, for transferring files, or Gopher, for remotely viewing files on another system, or Telnet for remotely accessing computer systems) which are automatically activated when such applications are needed. Thus, the invention of the World Wide Web and attendant rise of web browsers made Internet communication as easy as pointing and clicking on a graphical object.

Thus, while the Internet proper is not that new, the WWW application and most importantly the browser applications that it spawned, which automated much of the protocol specification that once had been the sole province of the computer adept, placed access to the information within the Internet into the hands of the virtually everyone. When this was achieved, the aforementioned explosion in information processing and network computing occurred. However, remember that such explosion, dates, at its earliest, only from 1989 (and even later, if the true, practical effects generated by powerful browsers are what are of interest).

Due to the competitive advantage that the Internet, WWW, and network computing confer, a majority of business concerns have been forced to purchase newer computing equipment which are Internet, WWW, and network computing compatible. However, as has been discussed above, those same concerns also often have older and larger computing systems that are still in use, but were purchased before the "Internet revolution." Furthermore, since these extant older systems often represent a significant investment in hardware and specialized software, and often provide a great deal of computing power, such concerns are often desirous to continue to use such hardware and software.

A good example of the foregoing would be the IBM AS/400 mid-range computing system. Although the AS/400 is still in production and use, the AS/400 was introduced prior to 1989, and hence pre-dated the WWW and Internet revolution.

Users have traditionally accessed the AS/400 via actual, physical, terminals which are physically connected to and designed for the AS/400. Indeed, this was the standard method of doing business on mid-range and mainframe computers prior to the explosion of use of the Internet.

Business concerns have begun to request that newer Internet/WWW compatible machines be given the capability to replace the actual physical terminals connected to the AS/400 machines. That is, business concerns have expressed their desire that a user be able to utilize a personal computer to connect to and interface with the AS/400 machines and programs much in the same manner that a web browser is able to connect and communicate with many different computers and programs. Furthermore, it appears to such business concerns that such connections should be able to be made given that modern web browsers interact with multiple different machines.

Initially, it was thought that such capabilities could be given to the machines by use of the aforementioned Telnet application. Telnet is the Transmission Control Protocol/Internet protocol (TCP/IP) standard network virtual terminal protocol that (a) is used for remote terminal connection service, and (b) allows a user at one site to interact with systems at other sites as if that user terminal were directly connected to computers at those other sites. M. Weik, *Communications Standard Dictionary* 475 (3rd ed. 1996). Unfortunately, when designers attempted to implement the Telnet application to allow the newer machines to interact with the AS/400s, they found that standard Telnet was not adequate to the job.

As has been stated, many larger, older computer systems, such as the AS/400, antedated the WWW/Internet revolution. In addition, such systems also antedated the open systems revolution that also went hand-in-hand with the WWW/Internet revolution. Consequently, although the AS/400 had a great deal of flexibility and networking capability built into it, much of the software written for the AS/400 has been designed for and keyed to the actual physical hardware of the AS/400 (because the software designers failed to keep up with the capability of the machine), rather than being designed for and keyed to conceptual network communication layers as is done in modern times.

It was found by designers, when they tried to implement Telnet with older computers such as the AS/400, that in some instances much of the (often custom produced, and hence very expensive) software was actually keyed to and dependent upon the actual hardware of the terminals and/or the attendant connectors and busses associated with the terminals. In AS/400 systems, terminals are identified by actual, physical, switches and connections associated with three things: a specific I/O processor, a specific port number on the specific I/O processor, and a station number (#0–#6) on the specific port number. It is easy for an AS/400 system administrator to change the default device name (based on I/O processor, port, station) instead to some administrator selected name. This name stays with the terminal, at this address (I/O processor, port, station) until the name is changed. The name stays the same no matter who logs on to the terminal. Another way of stating the foregoing is that the older software was keyed to a particular device name.

One specific example of such a situation is an accounting program designed such that payroll data applications can only be run from a one specific physical terminal (in a locked room) identified by its specific physical identification parameters. Another specific example is a factory control program where certain applications programs are only available to certain specific terminals, identified by specific physical identification parameters, located throughout the factory. Yet another specific example is that where the language of operating systems instructions as displayed on a login terminal (e.g., German, or French) is determined by the specific location of a terminal, as identified by its specific physical identification parameters.

Business concerns have invested a great deal of money and time into their installed software bases, and are loath to discard such. Consequently, they desire that any replacement of existing physical terminals be compatible with the business concerns' preexisting software bases. Restated, business concerns do not want to be told that replacement of physical terminals, attached to their older computing systems, with virtual terminals will require that much preexisting software be discarded or rewritten due to the incompatibility of the older installed software with the newer virtual terminals.

Unfortunately, Telnet is not designed to be indicative of physical terminal characteristics (that is, Telnet does not allow a user to choose and thereafter utilize a particular device name); rather, it is designed only to support virtual terminal sessions (that is, Telnet was designed to allow remote logon, and was not designed with terminal replacement in mind), and is consequently incapable of designating any physical terminal characteristics (i.e., is incapable of supporting device names). Thus, it is apparent from the foregoing that a method and system that will allow the creation and utilization of virtual terminal sessions such that each virtual terminal may have associated with it a specific device name if application software is dependent upon such specific terminal identification number.

SUMMARY OF THE INVENTION

It is therefore one object of the present invention to provide a method and system which yield improvements to virtual terminal applications.

It is another object of the present invention to provide a method and system which yield improvements to virtual terminal applications and which empower the virtual terminal applications to actually serve as identically functioning replacements for physical terminals within existing computer systems.

The foregoing objects are achieved as is now described. Provided are a method and system for replacing terminals, linked in a client server relationship with a central server, interacting with hardware specific programs within the central server, and wherein each terminal is identified by hardware specific programs within said central server via specific hardware attributes, and where the specific hardware attributes include at least a port identification and an I/O processor identification associated with the port identification. The method and system achieve the foregoing via the following. A processor is substituted for a selected terminal. Particular hardware attributes of the selected terminal are identified. The identified particular hardware attributes of the selected terminal are emulated using communications software. And, the processor is coupled to the central server via the communications software such that the processor interacts with hardware specific programs within the central server such that the substituted processor interacts with the hardware specific programs in a fashion indistinguishable from the selected terminal.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

An illustrative embodiment of the present invention will be set forth below. The illustrative embodiment will be made via the use of an implementation of Telnet on an IBM AS/400 system.

As set forth above, Telnet is the Transmission Control Protocol/Internet Protocol (TCP/IP) standard network virtual terminal protocol. Telnet is built on three fundamental elements: a Network Virtual Terminal (NVT) concept; a symmetric view of terminals and processes; and a practice of negotiating terminal options that extend beyond a basic defined substrate NVT. Those skilled in the art will recognize that Telnet can be utilized to couple communications entities over many different types of communications media such as the public Internet, private networks, or point-to-point modem communications.

An NVT is an imaginary device having a basic structure common to a wide range of real terminals. In Telnet, there is a certain defined "minimum" NVT which will form the substrate upon which later negotiated additional features will build.

A symmetric view of terminals and processes means that either or both a Telnet Server and a Telnet Client may request Telnet services and negotiate Telnet options. That is, during the creation of a particular NVT during a particular Telnet session, it is appropriate within the Telnet standards for either or both the Telnet Client and Telnet Server to propose additions to the NVT to be utilized during the session.

The practice of negotiating terminal options relates to the recognition that for specific virtual terminal options to work, such virtual terminal options must be supported on either end of a communications channel. Consequently, Telnet meets this requirement by having Telnet Clients and Telnet Servers negotiate with each other as to the virtual terminal characteristics that either can support.

The aforementioned options are negotiated utilizing a Telnet specific "vocabulary" consisting of the words DO, DON'T, WILL, and WON'T. However, no shorthand meaning can be assigned to the four vocabulary words because in the Telnet standard the meaning of the words can differ according to context (e.g., in one context the string "DO something" might equate to a command to an entity to actually do the operation, while in another context the string "DO something" might equate to the question of whether the "something" can be done). That is, the meanings of DO, DON'T, WILL, and WON'T in the Telnet standard are context dependent. However, it is helpful to keep in mind that the foregoing are the four basic commands in Telnet.

The foregoing described concept level descriptions of Telnet will become more clear in the description following, wherein an illustrative embodiment of the current invention is set forth.

Figure 1:
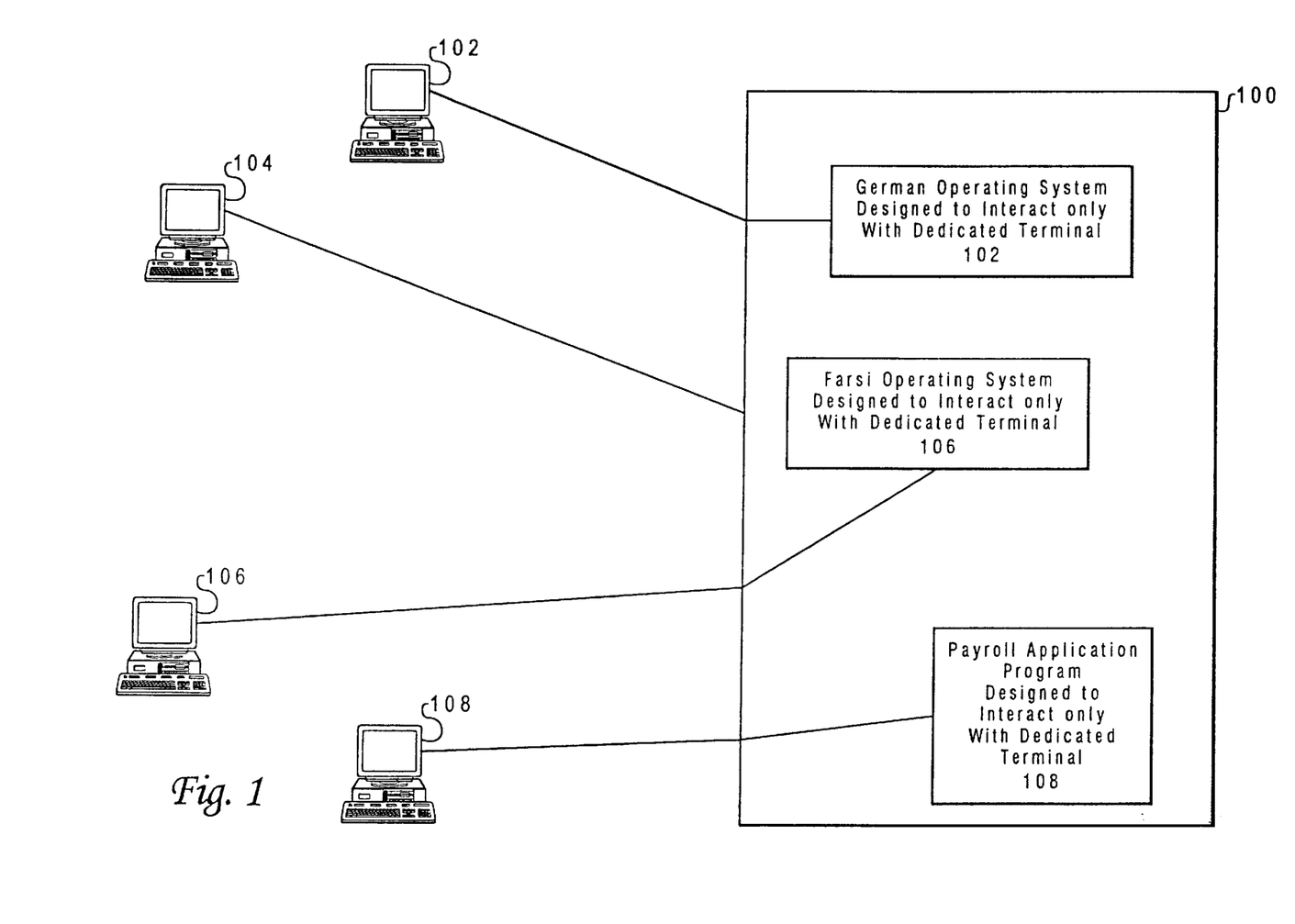
FIG. 1 depicts a high level partially schematic diagram which illustrates a situation in which an illustrative embodiment of the present invention may be applied.

Refer now to FIG. 1, which is a high level partially schematic diagram which illustrates a situation in which an illustrative embodiment of the present invention may be applied. Shown in FIG. 1 is a mid-range computer 100 (e.g. IBM AS/400) to which a number of dedicated terminals 102, 104, 106, and 108 (e.g., IBM 5250 terminals) are connected. Also shown in FIG. 1 is the fact that a number of separate and distinct programs are designed to interact with certain specific ones of dedicated terminals 102, 104, 106 and 108. Shown, for sake of illustration, are an operating system in German designed to interact only with dedicated terminal 102, an operating system in Farsi designed to interact only with dedicated terminal 106, and a payroll application designed to respond only to dedicated terminal 108. As is shown in FIG. 1, the separate and distinct programs are designed to interact with specifically named, or identified, terminals.

Figure 2:
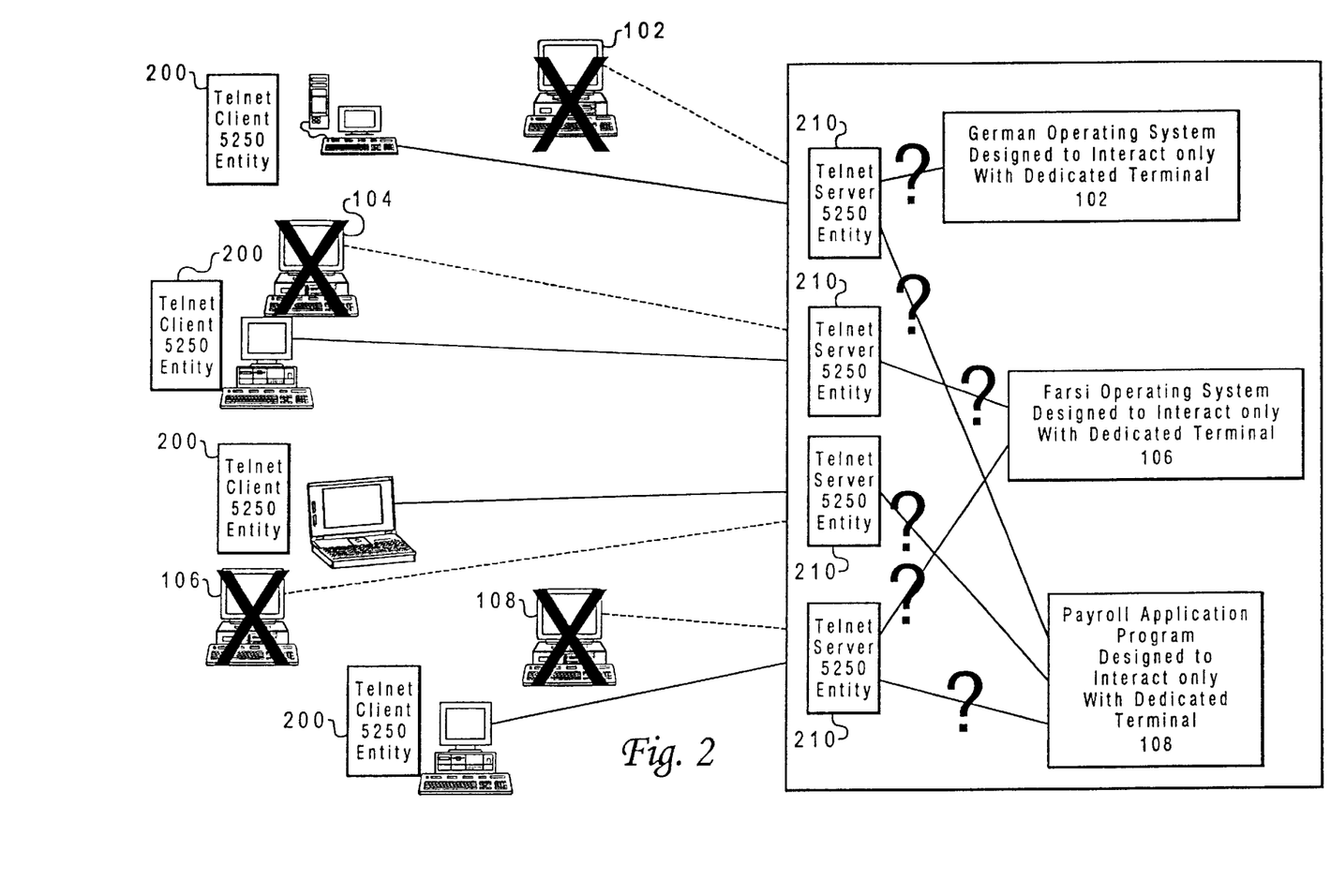
FIG. 2 depicts a high level partially schematic diagram which illustrates the replacement of dedicated terminals with replacement virtual terminals.

Refer now to FIG. 2, which is a high level partially schematic diagram which illustrates the replacement of dedicated terminals 102, 104, 106, and 108 with replacement virtual terminals. As is shown in FIG. 2, the virtual terminals are created and maintained by Telnet Server 5250 entities 210 and Telnet Client 5250 Entities 200 running on various different computers. FIG. 2 illustrates that the separate and distinct programs designed to interact with certain specific ones of dedicated terminals 102, 104, 106, and 108, as referenced in FIG. 1, are confused. The confusion is illustrated by the question marks shown on the links drawn between the Telnet Server 5250 Entities and the programs. Illustrated in FIG. 2 is that the confusion arises from the fact that Telnet creates different specific generic types of terminals, but does not create specifically identifiable individual ones of said created specific generic types. That is, as is illustrated in FIG. 2, Telnet can create an emulation of a generic IBM 5250 terminal, but it cannot specifically identify each individual emulated terminal. Thus, the operating system in German designed to interact only with dedicated terminal 102 is confused since it can't "see" a dedicated terminal 102. The operating system in Farsi designed to interact only with dedicated terminal 106 is confused since it can't "see" a dedicated terminal 106. And the payroll application designed to respond only to dedicated terminal 108 is confused since it can't "see" a dedicated terminal 108. This confusion arises because the programs, as is shown in FIG. 2, are expecting to communicate with specific terminals, but Telnet only creates generic terminals. Hence, there is no way to connect the appropriate emulation with the appropriate program, and confusion (illustrated by the question marks showing illustrative of the inability to connect the correct emulation with the correct program) arises. This deficiency of the inability to name terminals (or, equivalently, sessions, when a Telnet emulation of terminals is being considered) is remedied by the present invention.

Figure 3:
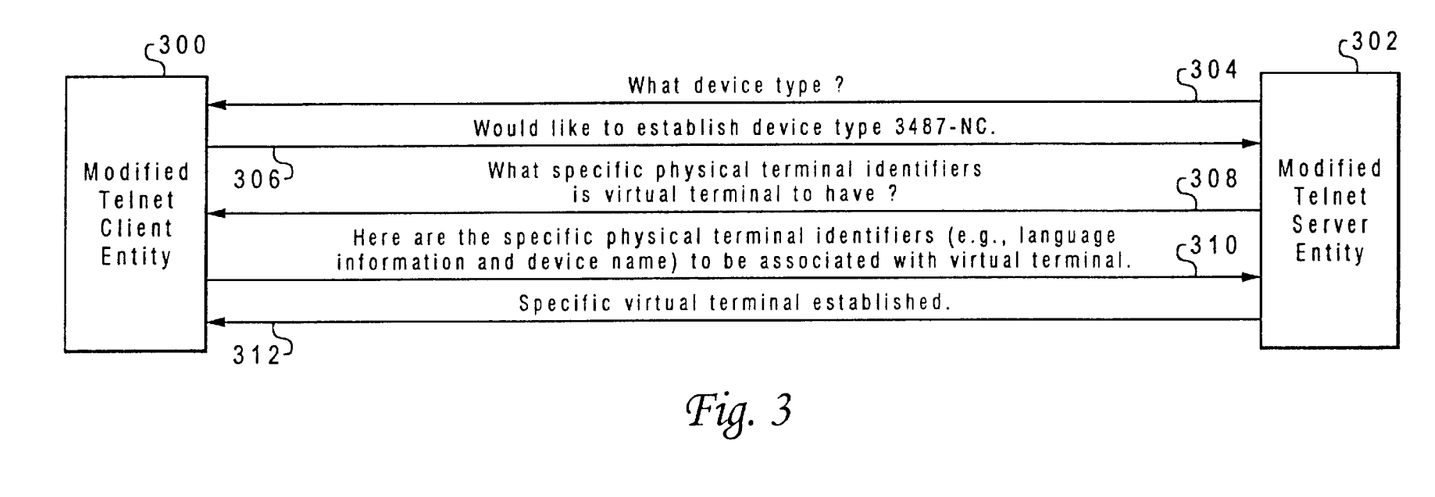
FIG. 3 depicts a high level partially schematic diagram setting forth an illustrative embodiment of the present invention.

Refer now to FIG. 3, which is a high level partially schematic diagram setting forth an illustrative embodiment of the present invention. As was discussed previously, Telnet has no built-in way to mimic the characteristics of a certain individual physical terminal. That is, standard Telnet can negotiate the functional characteristics of particular terminal, but beyond that has no further mechanism for designating what actual physical terminals a created NVT might correspond to. FIG. 3 illustrates how this deficiency of Telnet is resolved.

Shown in FIG. 3 are a Modified Telnet Client Entity 300 and a Modified Telnet Server Entity 302. At the point shown in FIG. 3, it is assumed that Modified Telnet Client Entity 300 and Modified Telnet Server Entity 302 have already negotiated the establishment of a base NVT. Thus, it remains to establish the specific enhancements of the NVT before the modified Telnet session is established which will allow a computer user (not shown) to interact with a computer (not shown) through Modified Telnet Client Entity 300 and Modified Telnet Server Entity 302 interaction. Accordingly, message 304 shows that Modified Telnet Server Entity 302 queries Modified Telnet Client Entity 300 and asks, "What device type of virtual terminal would you like to establish?" In response, message 306 depicts that Telnet Client 300 answers back, "I would like to establish device type terminal 3487-NC."

Figure 4:
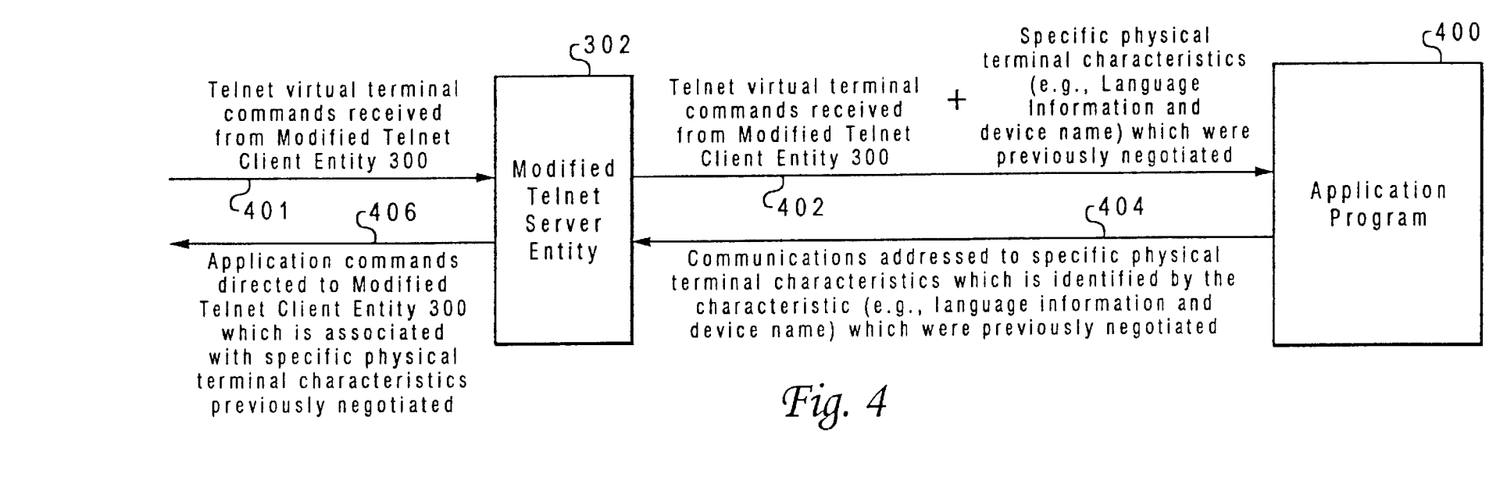
FIG. 4 illustrates how terminal commands from Modified Telnet Server Entity 302, subsequent to the negotiation depicted in FIG. 3, now appear to applications interacting with a virtual terminal created by negotiation between Modified Telnet Client Entity 300 and Modified Telnet Server Entity 302.

Message 308 illustrates that, upon receipt of Modified Telnet Client Entity's 300 answer, Modified Telnet Server Entity 302 recognizes that device type terminal 3487-NC is an indication that the Telnet session is to be one in which data related to characteristics more specific than standard Telnet defined characteristics is necessary. Consequently, Modified Telnet Server Entity 302 then asks Modified Telnet Client Entity 300, "If you were a physical terminal, what would your specific physical terminal language and name be?" Message 310 shows that, in response, Modified Telnet Client Entity 300 answers back with its specific physical terminal language and name, which contains the generic terminal identifiers (e.g., a 5250 type terminal) normally utilized by Telnet plus the additional specific terminal language and name to be utilized during the Telnet session. Message 312 shows Modified Telnet Server Entity 302 answering back that the specifically identifiable virtual terminal has been established and is now being supported. Those skilled in the art will recognize that the communication depicted herein can occur over virtually and communications medium, including but not limited to the public Internet, private networks, or point-to-point modem communications FIG. 4 illustrates how terminal commands from Modified Telnet Server Entity 302, subsequent to the negotiation depicted in FIG. 3, now appear to applications interacting with a virtual terminal created by negotiation between Modified Telnet Client Entity 300 (not shown) and Modified Telnet Server Entity 302. As is shown in FIG. 4 message 401, Telnet Virtual Terminal commands are received from Modified Telnet Client Entity 300 (not shown), and such commands are destined for application program 400. Application program 400 is of a type of program referenced above that has been designed to interact with specifically identifiable hardware terminals.

Accordingly, Modified Telnet Server Entity 302 interacts with Modified Telnet Client Entity 300 (not shown) to ensure that information received by application program 400 from Modified Telnet Server Entity 302 appear "as if" this information is originating from a terminal with a specific physical terminal name. This event is explicitly shown in FIG. 4 by the illustration that message 402 shows that the information delivered to application program 400 has associated with it specific physical terminal names that were explicitly established during an earlier negotiation phase such as that shown in FIG. 3.

Since application program 400 has been designed to interact with a specific physical terminal, message 404 shows that the communications from application program 400 are addressed to the specific terminal for which it was designed to interact. Accordingly, as is shown in FIG. 4 message 406, Modified Telnet Server Entity 302 responds to communications addressed to a specific physical terminal having the previously negotiated physical identifiers, and passes commands to Modified Telnet Client Entity 300 (not shown) on the basis of the defined specific physical terminal identification (that is, Modified Telnet Server Entity 302 only passes through to Modified Telnet Client Entity 300 (not shown). Thus, the illustrative embodiment of the present invention is able to allow the creation and utilization of virtual terminals with older software and computing systems specifically tied to the hardware of the computing systems.

The general problems which illustrative embodiments of the present invention are relevant to were discussed above. A specific instance of the foregoing noted general problems can now be discussed in the context of IBM AS/400 mid-range computers and IBM 5250 terminals attached to those computers. However, while the following discussion will set forth a discussion related to an illustrative embodiment tied to the above noted hardware, those skilled in the art will recognize that the following will apply to any situations where a specific physical terminal is to be replaced by a virtual terminal identified with the specific physical terminal to be replaced.

An IBM AS/400 is a mid-range computer. An IBM 5250 terminal is an old style dedicated physical terminal which is physically connected to an IBM AS/400 computer.

Currently, all AS/400 Telnet 5250 sessions use a virtual device name of QPADEVnnnn where nnnn typically changes each time the user starts a Telnet 5250 session. There is no way for customers to choose the device name of their 5250 sessions. This does not allow customers to start specific jobs based on the device name, restrict application access based on device name (for example, the location of the device), or determine keyboard language information of this device. Variable device names also increase service costs. AS/400 5250 dependent terminal sessions can be named by customers. SNA LU6.2 5250 sessions can be named by customers. Note that the world is moving away from dependent terminals and SNA toward TCP/IP connections, where Telnet 5250 is the way to create and run AS/400 5250 sessions.

There is a related problem which is also solved by this invention. It was impossible for a customer to set up Telnet 5250 clients on a given AS/400 in a language other than the AS/400 primary language. Some customers (for example, in places like Europe and eastern Canada) consider this a serious problem.

Figure 5A:
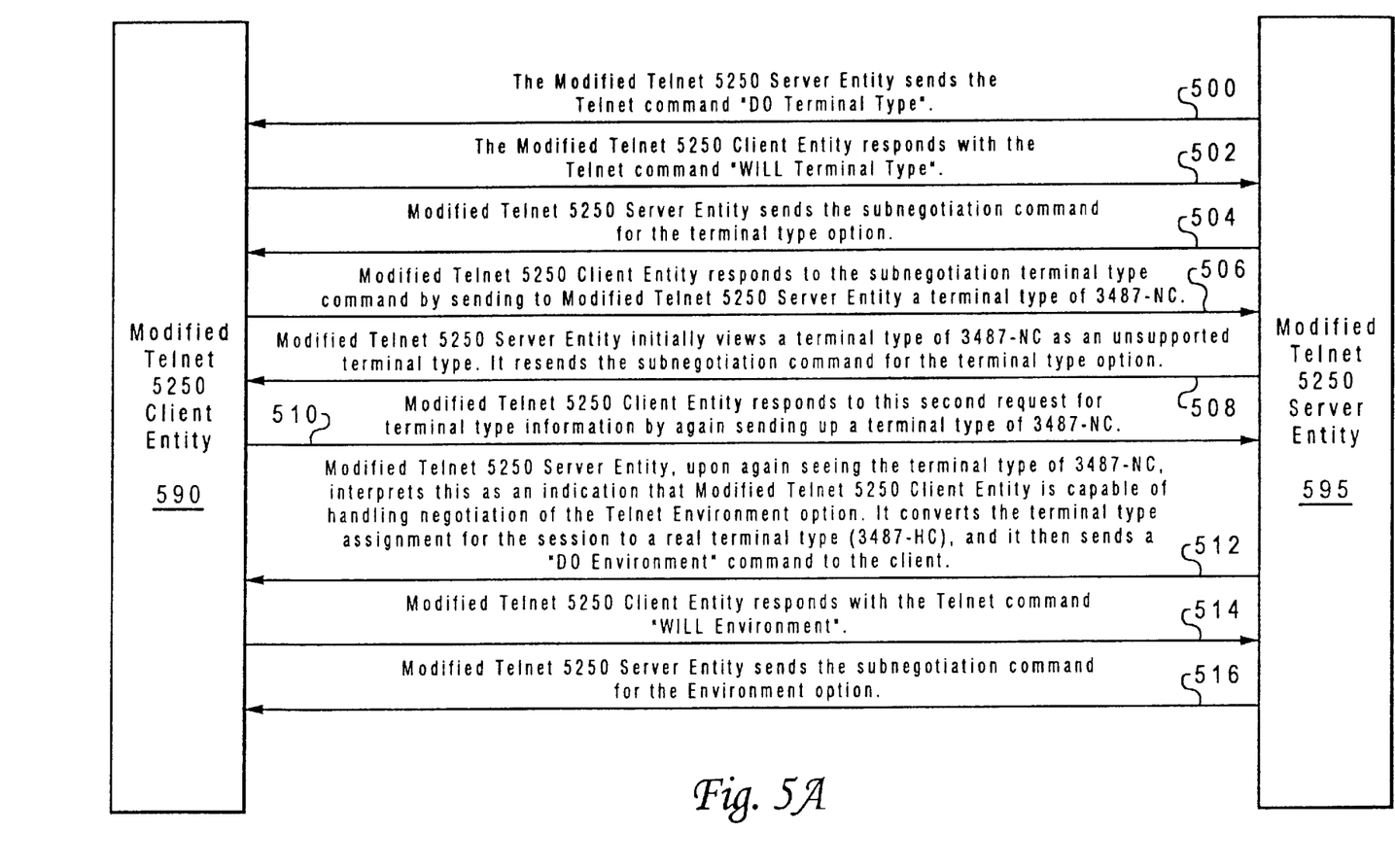
FIGS. 5A and 5B illustrate a much more detailed representation similar to the illustrative embodiments set forth in very high level form in FIG. 3 and FIG. 4.
Figure 5B:
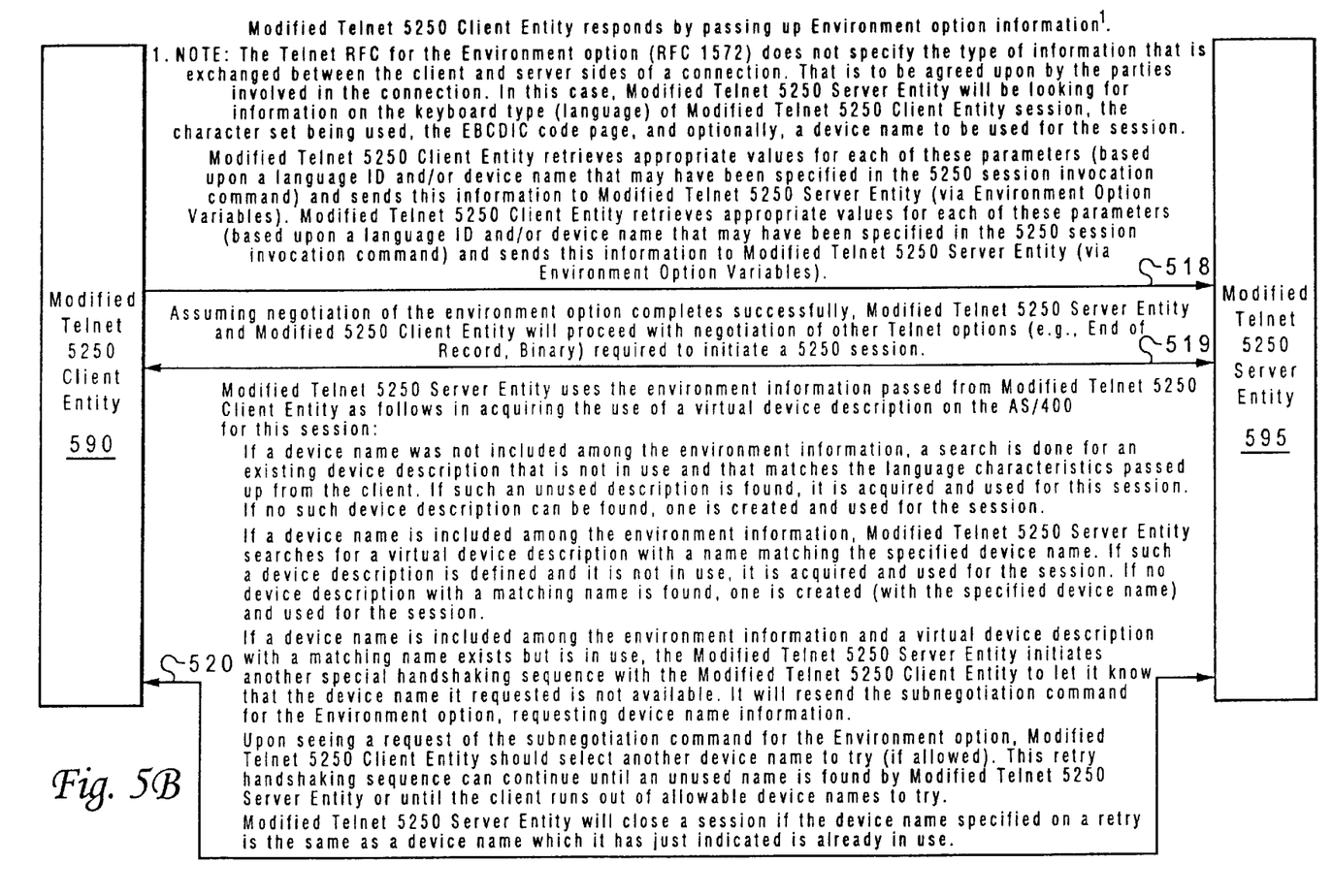

FIGS. 5A and 5B illustrate a much more detailed representation similar to the illustrative embodiments set forth in very high level form in FIG. 3 and FIG. 4. The illustrations of FIGS. 5A and 5B are drawn toward an illustrative embodiment of the present invention as such would be implemented in order to effectuate replacement of IBM 5250 hardware terminals connected to IBM AS/400 computing systems with modified Telnet virtual terminals.

As is shown in FIGS. 5A and 5B, an illustrative embodiment of the present invention involves enhancements to AS/400 Server Telnet 5250 and 5250 clients that use Telnet (PC, Work-station, Network Station, and X Terminal based). As was shown above in relation to FIGS. 3 and 4, an illustrative embodiment of the present invention can involve modification of both Telnet Servers and Telnet Clients.

The discussion of FIGS. 3 and 4, above, was intended to give a very abbreviated overview of events that occur in an illustrative embodiment. In practice, the handshaking required to effectuate the present invention is so involved that it is not practicable to discuss illustrative embodiment modifications of a Telnet Client and a Telnet Server simultaneously. Accordingly, the following discussion has broken down an illustrative embodiment Telnet Client and Server modifications to be first those surrounding the Telnet Server and second to be those surrounding the Telnet Client.

Refer now to FIGS. 5A and 5B. FIGS. 5A and 5B illustrate Modified Telnet 5250 Enhancements as such would be manifested on an IBM Network Station. The IBM Network Station is a TCP/IP device. In its unmodified form, Network Station 5250 sessions use Client Telnet 5250 to create and run 5250 sessions with the AS/400. Many IBM Network Station customers and potential customers have requested the ability to name their 5250 sessions.

Telnet will support a 'fenced' (generally undocumented) method for 5250 Telnet clients to specify the language of the 5250 session and optionally the device name of the 5250 session so as not to break any existing Telnet 5250 client.

In an illustrative embodiment, Server Telnet 5250 code is modified such that a Modified Server Telnet 5250 Entity is created that recognizes a new 'fenced' 3487-NC terminal type. The following Telnet option negotiation hand-shaking sequence, which is illustrated in FIGS. 5A and 5B then occurs.

Message 500 illustrates that the Modified Telnet 5250 Server Entity 595 sends the Telnet command "DO Terminal Type."

Message 502 shows that the Modified Telnet 5250 Client Entity 590 (it should be noted that at this point it is merely assumed that the Telnet entity with which Modified Telnet 5250 Server Entity is communicating is a modified Telnet entity; this assumption is subsequently confirmed or denied as is shown below) responds with the Telnet command "WILL Terminal Type."

Message 504 depicts that the Modified Telnet 5250 Server Entity 595 sends the subnegotiation command for the terminal type option.

Message 506 illustrates that the Modified Telnet 5250 Client Entity 590 responds to the subnegotiation terminal type command by sending to the Modified Telnet Server 5250 Entity 595 a terminal type of 3487-NC.

Message 508 shows that the Modified Telnet 5250 Server Entity 595 initially views a terminal type of 3487-NC as an unsupported terminal type. Consequently, Modified Telnet 5250 Server Entity 595 code resends the subnegotiation command for the terminal type option.

Message 510 depicts that the Modified Telnet 5250 Client entity 590 responds to this second request for terminal type information by again sending up a terminal type of 3487-NC.

Message 512 illustrates that the Modified Telnet 5250 Server Entity 595, upon again seeing the terminal type of 3487-NC, interprets this as an indication that the Modified Telnet 5250 Client Entity 590 is truly capable of handling negotiation of the Telnet Environment option (that is, that the Telnet Client Entity with which the Modified Telnet 5250 Server Entity 595 has been communicating up to this point truly is a modified entity; up to this point, while such a conclusion had been assumed, it had not yet been confirmed). Upon the confirmation that the Telnet Client is in fact a modified Telnet client, Modified Telnet 5250 Server Entity 595 converts the terminal type assignment for the session to a real terminal type (3487-HC), and then sends a "DO Environment" command to (now confirmed) Modified Telnet 5250 Client Entity 590.

Message 514 shows that Modified Telnet 5250 Client Entity 590 responds with the Telnet command "WILL Environment".

Message 516 depicts that the Modified Telnet 5250 Server Entity 595 sends the subnegotiation command for the Environment option.

Message 518 illustrates that Modified Telnet 5250 Client Entity 590 responds by passing up Environment option information. It is noted at this point that the Telnet RFC for the Environment option (RFC 1572) does not specify the type of information that is exchanged between the client and server sides of a connection. Such information is to be agreed upon by the parties involved in the connection. In at least one illustrative embodiment, Modified Telnet 5250 Server Entity 595 will be looking for information on the keyboard type (language) of the Client 5250 session, the character set being used, the EBCDIC code page, and, optionally, a device name to be used for the session. Based upon the foregoing information, Modified Telnet 5250 Client Entity 590 retrieves appropriate values for each of these parameters (based upon a language ID and/or device name that may have been specified in the 5250 session invocation command) and sends this information to Modified Telnet 5250 Server Entity 595 (via Environment Option Variables). The modified Telnet 5250 Server Entity 595 saves the language and/or device name for later use when acquiring a virtual device description.

Message 519 depicts that, assuming negotiation of the environment option completes successfully, Modified Telnet 5250 Server Entity 595 and Modified Telnet 5250 Client Entity 590 will proceed with negotiation of other Telnet options (e.g., End of Record, Binary) required to initiate a 5250 session.

Message 520 shows that Modified Telnet 5250 Server Entity 595 uses the environment information passed from the 5250 client as follows in acquiring the use of a virtual device description on the AS/400 for this session:

(1) If a device name was not included among the environment information, a search is done for an existing device description that is not in use and that matches the language characteristics passed up from the client. If such an unused description is found, it is acquired and used for this session. If no such device description can be found, one is created and used for the session.

(2) If a device name is included among the environment information, Modified Telnet 5250 Server Entity 595 searches for a virtual device description with a name matching the specified device name. If such a device description is defined and it is not in use, it is acquired and used for the session. If no device description with a matching name is found, one is created (with the specified device name) and used for the session.

(3) If a device name is included among the environment information and a virtual device description with a matching name exists but is in use, Modified Telnet 5250 Server Entity 595 initiates another special handshaking sequence with Modified Telnet 5250 Client Entity 590 to let it know that the device name it requested is not available. It will resend the subnegotiation command for the Environment option, requesting device name information.

With respect to message 520, upon seeing a rerequest of the subnegotiation command for the Environment option, the Modified Telnet 5250 Client Entity 590 should select another device name to try (if allowed). This retry handshaking sequence can continue until an unused name is found by Modified Telnet 5250 Server Entity 595 or until the client runs out of allowable device names to try.

Also with respect to message 520, Modified Telnet 5250 Server Entity 595 will close a session if the device name specified on a retry is the same as a device name which it has just indicated is already in use.

Figure 6:
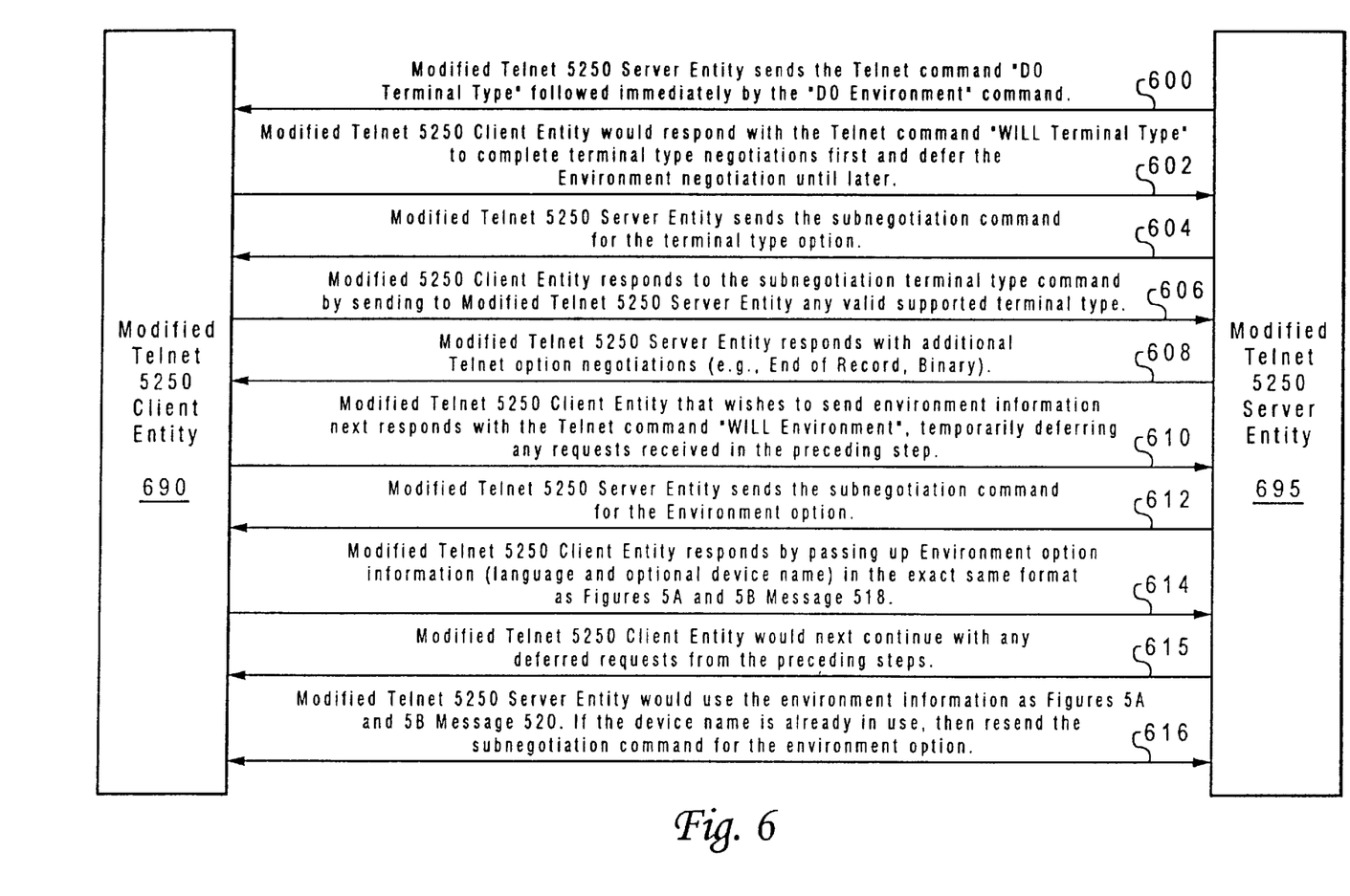
FIG. 6 depicts how an embodiment of the present invention would be implemented if the Telnet standard were altered to include the functions of the present invention.

In another illustrative embodiment which is an extension of that set forth previously, Telnet will be enhanced to support a documented (that is, Telnet proper will be modified in accordance with the present invention) interface for 5250 Telnet clients to pass in optional language information and optional 5250 device name information. This support will be made available on an official AS/400 release cycle (with Beta testing available). FIG. 6, which will still depict the Telnet entities as "modified" even though it is to be understood that the illustration is intended to relate to Telnet proper ultimately modified to incorporate an embodiment of the present invention, shows that depicts such modified Telnet standard in operation will work as follows:

Message 600 shows that Modified Telnet 5250 Server Entity 695 sends the Telnet command "DO Terminal Type" followed immediately by the "DO Environment" command.

Message 602 depicts that a Modified Telnet 5250 Client Entity 690 would respond with the Telnet command "WILL Terminal Type" to complete terminal type negotiations first and defer the Environment negotiation until later.

Message 604 illustrates that Telnet Modified 5250 Server Entity 695 sends the subnegotiation command for the terminal type option.

Message 606 shows that Modified Telnet 5250 Client entity 690 responds to the subnegotiation terminal type command by sending to the Telnet 5250 code any valid supported terminal type.

Message 608 depicts that Modified Telnet 5250 Server Entity 695 responds with additional Telnet option negotiations (e.g., End of Record, Binary).

Message 610 illustrates that Modified Telnet 5250 Client Entity 690 that wishes to send environment information next responds with the Telnet command "WILL Environment", temporarily deferring any requests received in the preceding step.

Message 612 shows that Modified Telnet 5250 Server Entity 695 sends the subnegotiation command for the Environment option.

Message 614 depicts that Modified Telnet 5250 Client Entity 690 responds by passing up Environment option information (language and optional device name) in the exact same format as that of FIGS. 5A and 5B message 518, discussed above. The modified Telnet 5250 Server Entity 695 saves the language and/or device name for later use when acquiring a virtual device description.

Message 615 shows that Modified Telnet 5250 Client Entity 690 would next continue with any deferred requests from the preceding steps.

Message 616 illustrates that Modified Telnet 5250 Server Entity 695 would use the environment information as described in relation to FIGS. 5A and 5B message 520, discussed above. If the device name already exists, the subnegotiation command for the Environment option is repeated.

The foregoing discussions have described the interaction of Telnet Servers and Clients which will occur if both the Telnet Server and Telnet Client have been modified in accord with the present invention. In the event that a modified Telnet client is interacting with an older AS/400 release which does not have the Modified Server Telnet 5250 Entity code that recognizes the 3487-NC terminal type and initiates the Environment option negotiation, a Modified Telnet 5250 Client Entity will avoid any problems caused by such mismatch via the following sequence.

Initially, the Modified Telnet 5250 Client Entity will attempt to initiate negotiation of the Environment (because initially the modified Telnet 5250 Client is not aware that the Telnet Server is unmodified), as discussed above, option from its (the Modified Telnet 5250 Client's) side. The Server Telnet 5250 in this case will not acknowledge support of this option (since it was not prompted by the "undocumented" handshaking sequence described above; that is, since the unmodified Server Telnet 5250 Entity does not support an environment option). Subsequently, the Modified Telnet 5250 Client Entity will determine that the options it requires to initiate a session are not supported by the host Telnet (i.e., that the Telnet Server has not been modified in the fashion set forth herein) and consequently, the Modified Telnet 5250 Client Entity will disconnect the Telnet session and start over (i.e., initiate the retry process).

During the retry process, since the Modified Telnet 5250 Client Entity has determined that the Telnet Server with which the Modified Telnet 5250 Client Entity is dealing is unmodified, it will not require the environment option to be negotiated. Instead, the Modified Telnet 5250 Client Entity will revert to acting as if it would have if it had been unmodified; that is, the terminal type passed to Server Telnet 5250 on the first request for this information will be a valid 3487-HC terminal type (rather than 3487-NC). Thus, the foregoing will ensure that the Modified Telnet 5250 Client Entity will continue to function correctly even if not every Telnet Server with which the Modified Telnet 5250 Client interacts has been modified to support the ability to name specific device terminals.

It was mentioned generally, above, that there are many instances where the ability to name devices in Telnet sessions could have many advantages. A few specific instances wherein the IBM Network Station 5250 client uses the Server Telnet support discussed above in relation to FIG. 3 to provide an advantageous use are as follows.

The ability to support device names in Telnet will allow the maintenance of pre-existing multilingual operating systems as has been explained, the present invention allows the ability for Network Station Telnet 5250 clients to choose and utilize device names during Telnet sessions. One way in which such device names can be useful is to designate what language (German, French, Farsi, etc.) the Telnet session is to be conducted in.

As has been explained above, one of the idiosyncracies of older computing systems is that the software has been keyed to the hardware. A specific example of this is where the same AS/400 is being utilized in a multilingual environment, such as in Europe where one user might understand French, another German, and another Italian. It is not uncommon for the language in which the AS/400 operating system responds to be keyed to an actual device name, with such device names serving as stand-ins for geographic locations. Thus, one device name indicates that operating systems commands in German are to be utilized, another device name indicates that operating systems in French are to be utilized, while another device name might be indicate that Farsi is to be utilized.

Thus, in such environments, the language in which computing sessions are conducted upon the specific device name of a terminal logging onto the system or portions of such device names. That is, the administrator has configured the system such that it supports multiple 5250 sessions for different national languages based upon the device identification of a terminal. An illustrative embodiment of the present invention will allow such pre-existing practices to be continued. That is, the allowance of the naming of devices using Telnet modified as set forth herein, will allow the pre-existing operating systems, keyed to specific device identification, to continue to function as before.

The above discussion focused on how an illustrative embodiment of the proposed invention named devices. However, no specific examples of device naming were given.

By way of example, in an illustrative embodiment, device names for Telnet 5250 sessions are optional and, there are 6 alternatives for the administrator to choose from on a user by user basis.

In an illustrative embodiment, the administrator sets the optional device name in the AS/400 Network Station Manager program, as system default or user by user. The first four options are "roaming"; they move with the user from Network Station to Network Station. The last two options are tied to the Network Station hardware.

The first "roaming" option that can be utilized is to effect a specific device name setting as specified by the administrator in the Network Station Manager. Subsequently, the Modified Telnet 5250 Client Entity uses this exact name when creating the 5250 session. A specific example would be for the Network Station Manager to assign a specific Modified Telnet Client Entity the name "JOE". A mirror requirement for this specific naming would be the further constraint that the Modified Telnet Server Entity only allow one session utilizing the name to be active at a time on the AS/400 using the same 5250 session name. Thus, the net effect of such modifications is that a specific user identification has been created, but, unlike a physical 5250 terminal identification, this specific user identification is mobile in that it can go wherever the Modified Telnet Client Entity assigned the specific identification parameters goes.

The second "roaming" option that can be utilized is to utilize the forgoing specific device name setting, but appending to it some integer number: "JOE+n". Subsequently, one or more Modified Telnet 5250 Client Entities utilize the name specified by the administrator via Network Station Manager and appends a number to the device name requested during Environment negotiation. Thereafter, N determines the maximum number of sessions. For example, "JOE+4" would allow four 5250 sessions with the names of "JOE1", "JOE2", "JOE3", and "JOE4". The net effect of such modifications is that the user "JOE" can run up to four different applications on the AS/400 (for example, e-mail, calendar, a parts inventory application, and a new order application). This will thus allow the continued use of any software actually keyed to the specific parameters of the physical terminal.

The third "roaming" option is that of utilizing the USERID of the user of the Network Station as the device name. The 5250 emulator retrieves the USERID of the user logged onto this network station and passes this name to Telnet 5250 during environment negotiations. Only one active session would be allowed on an AS/400 with this name. USERID could be useful as a system default device name parameter.

The fourth "roaming" option is that of utilizing the USERID of the user of the Network Station, but appending to it some integer number: "USERID+N". In this option, the Modified Telnet 5250 Server Entity retrieves the USERID of the user logged onto a network station and appends to the USERID an integer number N. This "USERID+N" is then passed to Modified Telnet 5250 Client Entity during environment negotiation. The combination of "USERID+N" then becomes the specific device identifier. As discussed above in relation to the second "roaming" option, N determines the maximum number of sessions. Thus, for example, a user with a USERID of MIKE would be allowed session names of MIKE1, MIKE2, MIKE3, and MIKE4 (assuming N had been set to 4).

The fifth option could be to use a MAC Address based name. The Modified Telnet 5250 Client and Modified Telnet 5250 Server work together to retrieve the MAC address of a specific Network Station and use a part of this information in coming up with a device name to be used during environment negotiations. Thereafter, only one active session would be allowed on an AS/400 with a given MAC address name. Subsequently, this type of device name specification would preserve the ability to allow an administrator to control where applications run. For example, a payroll application can only be run by four possible users on a specific Network Station—maybe the Network Station that is locked in an AS/400 machine room. Note: An alternative to using MAC address would be to use the IP address. On a Network Station, the MAC address is probably better because a TCP/IP protocol like DHCP can dynamically change the Network Station IP address; a MAC address should never change.

The sixth option would be to extend the use a MAC address based name by appending an integer N. The 5250 emulator would generate a device name using part of the Network Station's MAC address, with a number (1 to N) appended to the MAC Address part of the name. Consequently, the foregoing allows the preservation of the ability to control access to computing resources while allowing the user to run multiple 5250 applications.

As an additional advantage to those discussed previously above, the illustrative embodiments set forth also provide an administrator with a method of limiting the number of 5250 sessions on the Network Station. Each 5250 session on the Network Station requires memory (prevent a user getting themselves into trouble by starting lots of 5250 sessions, then trying to start another client application that won't start due to no memory available), also each 5250 session requires AS/400 resources.

As was noted earlier in relation to the discussion of the Telnet handshaking sequence, a mechanism is provided for trying another session name if a given name is in use. In light of the specific possibilities for naming devices set forth above, a specific example can be illustrated as follows. If device naming of "JOE+8" were to be specified by an administrator, the Telnet Modified Client and Telnet Modified Server would first try the name JOE1. If it is determined (via receiving another subnegotiation command with the environment option) that this name was already in use, the scheme would just advance to the next available name (JOE2), and attempt environment negotiation with that name. This would continue until a session with a given name was successfully initiated or until all instances of a name+ number (i.e., JOE+1 through JOE+8) had been attempted. JOE could be a user who signs on to multiple Network Stations at one time or JOE could be a system administrator.

Another illustrative embodiment, proposed in addition to those set forth above, is to allow an administrator to have a "smart card" that allows them to run sensitive applications from any Network Station. The Modified Telnet 5250 Client Entity could be requested to check for a smart card plugged into the Network Station (for example, PCMCIA card). The embodiment is to be such that, if the smart card was found resident on any computing system, the Modified Telnet 5250 Client is to use this device name to identify itself. In order to access these sensitive applications, the user would need the physical smart card and have a valid USERID/PASSWORD on an AS/400. Information available in the smart card, that could be used by the server system, could include public/private key encryption information, digital signatures, and certificates.

Figure 7:
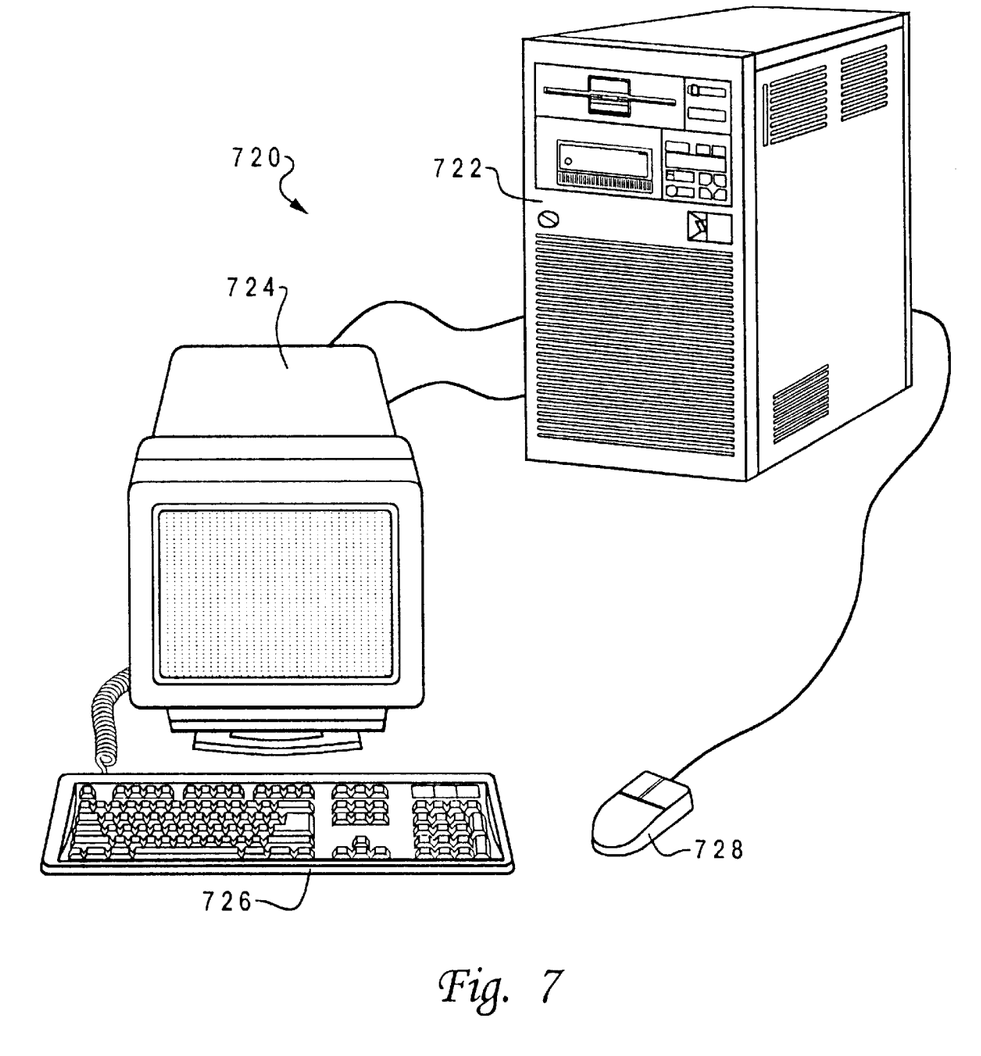
FIG. 7 depicts a pictorial representation of a data-processing system which can be utilized in accordance with the method and system of the present invention.

FIG. 7 depicts a pictorial representation of a data-processing system which can be utilized in accordance with the method and system of the present invention. The system and method provided by the present invention can be implemented with the data-processing system depicted in FIG. 7. A computer 720 is depicted which includes a system unit 722, a video display terminal 724, a keyboard 726, and a mouse 728. Computer 720 may be implemented utilizing any suitable computer such as the IBM RISC/6000 computer or IBM "Aptiva" computer, both products of International Business Machines Corporation, located in Armonk, N.Y. "RISC SYSTEM/6000" and "Aptiva" are trademarks of International Business Machines Corporation.

Figure 8:
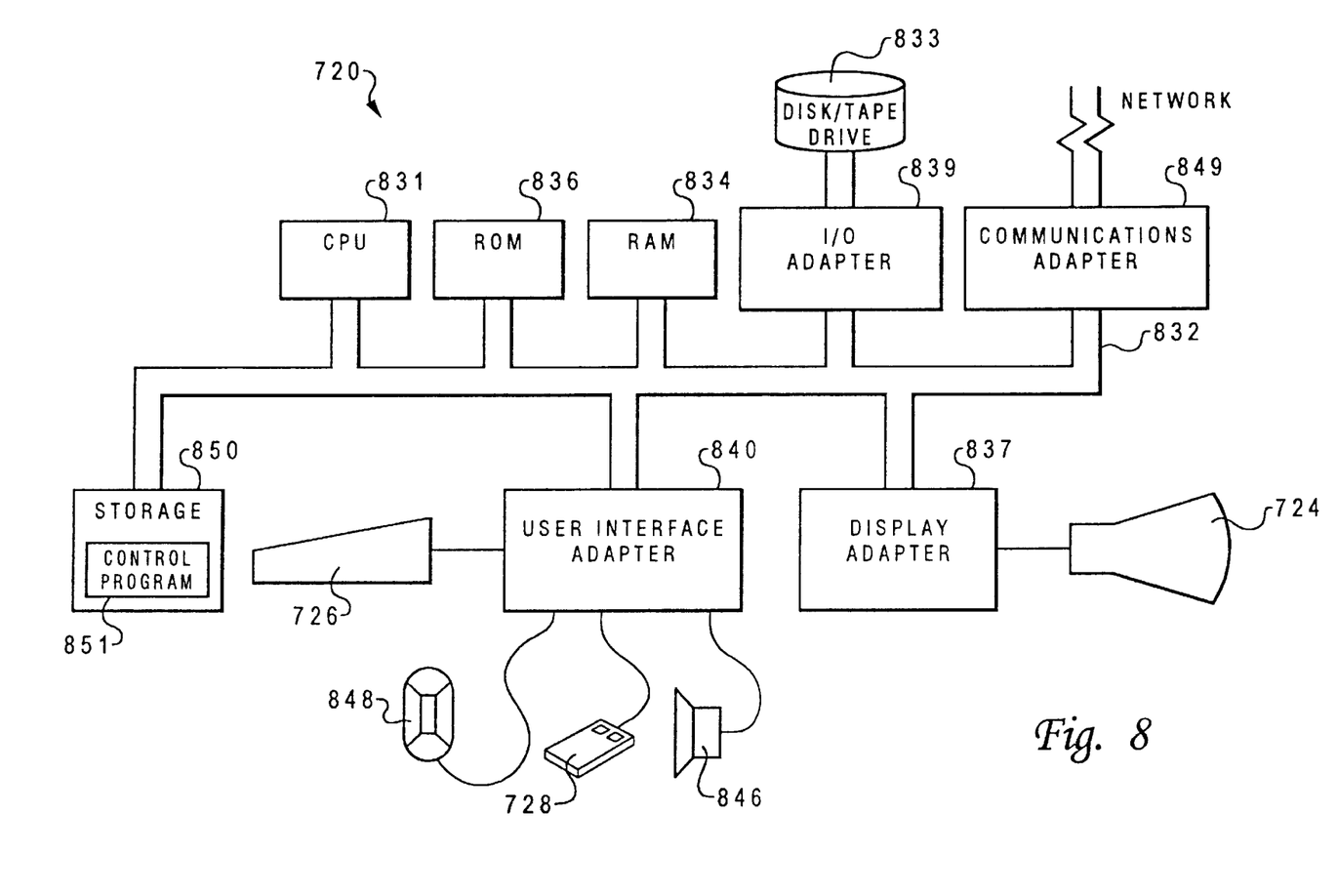
FIG. 8 is an illustration of a representative hardware environment which can be utilized in accordance with the method and system of the present invention.

FIG. 8 is an illustration of a representative hardware environment which can be utilized in accordance with the method and system of the present invention. FIG. 8 depicts selected components in computer 720 in which a preferred embodiment of the present invention may be implemented. System unit 722 includes a Central Processing Unit ("CPU") 831, such as a conventional microprocessor, and a number of other units interconnected via system bus 832. Computer 720 includes random-access memory ("RAM") 834, read-only memory ("ROM") 836, display adapter 837 for connecting system bus 832 to video display terminal 724, and I/O adapter 839 for connecting peripheral devices (e.g., disk and tape drives 833) to system bus 832. Video display terminal 724 is the visual output of computer 720, which can be a CRT-based video display well-known in the art of computer hardware. However, with a portable or notebook-based computer, video display terminal 724 can be replaced with an LCD-based or a gas plasma-based flat-panel display. Computer 720 further includes user interface adapter 840 for connecting keyboard 726, mouse 728, speaker 846, microphone 848, and/or other user interface devices, such as a touch screen device (not shown), to system bus 832. Communication adapter 849 connects computer 720 to a data-processing network.

Computer 720 also includes a graphical user interface that resides within a machine-readable media to direct the operation of computer 720. Any suitable machine-readable media may retain the graphical user interface, such as RAM 834, ROM 836, a magnetic diskette, magnetic tape, or optical disk (the last three being located in disk and tape drives 833). Any suitable operating system and associated graphical user interface (e.g., Microsoft Windows) may direct CPU 831. For example, the AIX operating system and AIXwindows windowing system (i.e., graphical user interface) can direct CPU 831. The AIX operating system is IBM's implementation of the UNIX operating system. UNIX is a trademark of UNIX Systems Laboratories, Inc. The RISC System/6000 system, among others, can run on the AIX operating system. Other technologies can also be utilized in conjunction with CPU 831, such as touch-screen technology or human voice control. In addition, computer 720 includes a control program 851 which resides within computer storage 850. Control program 851 contains instructions that when executed on CPU 831 carries out the appropriate operations depicted in FIGS. 3, 4, 5A, 5B, and 6 as represented in the figures and described herein.

Those skilled in the art will appreciate that the hardware depicted in FIG. 8 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already depicted.

In the example depicted in FIG. 8, the computer program product (i.e. control program 851) can reside in computer storage 850. However, it is important that while the present invention has been, and will continue to be, described in the context of a fully functional computing system, those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media such as floppy disks, hard disk drives, CD ROMs, and transmission type media such as digital and analogue communication links.

The foregoing descriptions have referenced checking copies of files resident within private networks as to the ages of the files, the contents of the files, the locations of the copies of the files, etc. In an illustrative embodiment of the invention such file manipulation could be done via the use of distributed file systems, a few examples of which are NFS (Network Filesytem), DFS (Distributed Filesytem), and AFS (Andrews Filesystem).

While an illustrative embodiment has been particularly shown and described, it will be understood by those skilled in the art that various changes in form and detail may be made therein without departing from the spirit and scope of the illustrative embodiment.

What is claimed is:

1. A method for replacing one or more terminals, linked in a client server relationship with a central server, interacting with hardware specific programs within said central server, wherein each terminal is identified by hardware specific programs within said central server via specific hardware attributes, said specific hardware attributes including at least a port identification and an I/O processor identification associated with said port identification, said method comprising the steps of:

selecting one of the terminals linked to the central server for replacement;

providing a network station for use in replacing said selected terminal;

identifying particular hardware attributes of said selected terminal;

emulating said identified particular hardware attributes of said selected terminal using communications software; and coupling said network station to said central server via said communications software such that said network station interacts with hardware specific programs within said central server in a fashion indistinguishable from said selected terminal.

2. The method of claim 1 wherein said step of identifying particular hardware attributes of a selected terminal further comprises the step of identifying a specific station number of said selected terminal.

3. The method of claim 1 wherein said step of emulating further comprises the step of emulating said identified particular hardware attributes of said selected terminal using modified Telnet communications software.

4. The method of claim 1 wherein said step of coupling said network station to said central server via said communications software further comprises the step of coupling via communications over the public Internet.

5. A system for replacing one or more terminals, linked in a client server relationship with a central server, interacting with hardware specific programs within said central server, wherein each terminal is identified by hardware specific programs within said central server via specific hardware attributes, said specific hardware attributes including at least a port identification and an I/O processor identification associated with said port identification, said system comprising:

a network station for use in replacing a selected one of the terminals linked to the central server;

means for identifying particular hardware attributes of said selected terminal;

means for emulating said identified particular hardware attributes of said selected terminal using communications software; and means for coupling said network station to said central server via said communications software such that said network station interacts with hardware specific programs within said central server in a fashion indistinguishable from said selected terminal.

6. The system of claim 5 wherein said means for identifying particular hardware attributes of a selected terminal further comprises means for identifying a specific station number of said selected terminal.

7. The system of claim 5 wherein said means for emulating further comprises means for emulating said identified particular hardware attributes of said selected terminal using modified Telnet communications software.

8. The system of claim 5 wherein said means for coupling said network station to said central server via said communications software further comprises means for coupling via communications over the public Internet.

9. A program product for replacing one or more terminals, linked in a client server relationship with a central server, interacting with hardware specific programs within said central server, wherein each terminal is identified by hardware specific programs within said central server via specific hardware attributes, said specific hardware attributes including at least a port identification and an I/O processor identification associated with said port identification, said program product comprising:

means for identifying particular hardware attributes of a selected one of the terminals linked to the central server;

means for emulating said identified particular hardware attributes of said selected terminal using communications software;

means for coupling a network station to said central server via said communications software such that said network station interacts with hardware specific programs within said central server in a fashion indistinguishable from said selected terminal; and signal bearing means bearing said means for substituting, said means for identifying, said means for emulating, and said means for coupling.

10. The program product of claim 9 wherein said signal bearing means further comprises transmission media.

11. The program product of claim 9 wherein said signal bearing means further comprises recordable media.

12. The program product of claim 9 wherein said means for identifying particular hardware attributes of a selected terminal further comprises means for identifying a specific station number of said selected terminal.

13. The program product of claim 9 wherein said means for emulating further comprises means for emulating said identified particular hardware attributes of said selected terminal using modified Telnet communications software.

14. The program product of claim 9 wherein said means for coupling said network station to said central server via said communications software further comprises means for coupling via communications over the public Internet.

* * * * *